United States Patent [19]

Brunner et al.

[11] Patent Number: 5,452,507
[45] Date of Patent: Sep. 26, 1995

[54] METHOD FOR LAYING UNDERWATER PIPELINES IN DEEP WATER

[75] Inventors: Guido V. Brunner, Milan; Giovanni Rosa, San Donato Milanese, both of Italy

[73] Assignee: Saipem, S.p.A., Milan, Italy

[21] Appl. No.: 107,259

[22] Filed: Aug. 16, 1993

[30] Foreign Application Priority Data

Jul. 9, 1993 [IT] Italy ................... MI93A01489

[51] Int. Cl.$^6$ ................... F16L 1/12
[52] U.S. Cl. ................... 29/428; 29/890.14; 29/458; 29/469.5; 29/527.1; 285/286; 138/146; 138/177; 405/158; 405/170; 156/158
[58] Field of Search ................... 428/34.5, 34.6, 428/34.7, 36.3, 36.9, 34.1, 35.8; 138/146, 155, 177; 405/154, 158, 166, 169, 170; 228/175; 285/286

[56] References Cited

U.S. PATENT DOCUMENTS

| | | | |
|---|---|---|---|
| 2,786,264 | 3/1957 | Colombo | 156/158 X |
| 3,226,807 | 1/1966 | Orr | 290/890.14 |
| 3,286,341 | 11/1966 | Miller | 228/175 |
| 3,404,906 | 10/1968 | Hutton | 29/890.14 X |
| 3,420,277 | 1/1969 | Ceintrey | 138/146 X |
| 3,453,716 | 7/1969 | Cook | 29/527.4 X |
| 3,490,983 | 1/1970 | Lee | 428/36.3 X |
| 3,635,498 | 1/1972 | Patel | 285/286 X |
| 3,666,586 | 5/1972 | Lacey | 156/158 X |
| 3,817,805 | 6/1974 | Surikov et al. | 138/155 X |
| 3,967,020 | 6/1976 | Uemura et al. | 428/35.8 |
| 4,026,582 | 5/1977 | Abe et al. | 285/286 X |
| 4,134,529 | 1/1979 | Hara et al. | 156/158 X |
| 4,230,293 | 10/1980 | Hamm et al. | 428/34.5 X |
| 4,293,005 | 10/1981 | Kelly | 138/155 X |
| 4,347,090 | 8/1982 | Anderson et al. | 428/34.5 X |
| 4,366,658 | 1/1983 | Maistre | 428/36.3 X |
| 4,454,285 | 6/1984 | Bijen | 524/5 |
| 4,610,740 | 9/1986 | Nordstrom | 138/155 X |
| 4,611,635 | 9/1986 | Jarvis | 138/146 |
| 4,961,598 | 10/1990 | Sundholm | 285/286 X |
| 4,971,846 | 11/1990 | Lundy | 428/35.8 |
| 5,110,644 | 5/1992 | Sparks et al. | 428/36.3 |
| 5,265,790 | 11/1993 | Mumford et al. | 285/286 X |
| 5,320,697 | 6/1994 | Hegler et al. | 156/158 |

FOREIGN PATENT DOCUMENTS

| | | | |
|---|---|---|---|
| 51136 | 3/1988 | Japan | 428/36.3 |
| 14125 | 9/1991 | WIPO | 428/34.5 |

Primary Examiner—John A. Ricci
Attorney, Agent, or Firm—Robert D. Schaffer; Rogers and Wells

[57] ABSTRACT

A method for laying underwater pipelines in deep water, using the J launching technique, comprising joining together mixed-structure pipes consisting of a steel core reinforced with a composite material consisting of a hardenable material containing continuous fibers and in which:

the continuous fiber is wound about the steel core as a helical winding which forms an angle of between 65° and 87° with the pipe axis;

the ratio of the thickness of the composite layer to the thickness of the steel core is between 2 and 8;

the weight of the mixed-structure pipe in water is between about 40 and 100 kg/m.

8 Claims, 3 Drawing Sheets ns on sea beds of depth exceeding 1000 m.

METHOD FOR LAYING UNDERWATER PIPELINES IN DEEP WATER

This invention relates to a method for laying underwater pipelines in deep water.

More particularly, the invention relates to a method for laying underwater pipelines, intended for conveying fluids and in particular natural gas or crude oil, on sea beds of depth exceeding 1000 meters and generally between 3000 and 4000 meters. The laying of underwater pipelines for gas or hydrocarbon transportation through relatively long sea distances is a practice which has existed for some years.

Up to the present time such pipelines have been laid on sea beds at a maximum depth of about 600–700 meters in the case of very long large-diameter pipelines (trunk lines) used for transporting products from their place of production to their place of consumption, or on sea beds of 1000–1500 meters depth in the case of short small-diameter pipelines (flow lines) used for transportation from off-shore wells to production structures. Trunk lines are of steel construction covered with plastics materials, for example with thermoplastic resins such as polyethylene or with epoxy, polyurethane or other resins, possibly fibre-reinforced, for protection against corrosion and abrasion. In the case of the shallowest sea beds this covering is further covered with a layer of cement, possibly reinforced with a metal mesh or artificial fibres, having the main purpose of providing additional weight and the secondary purpose of providing mechanical protection.

With regard to the laying method, trunk lines are currently almost exclusively laid by dedicated ships. Specifically, the trunk lines are prepared by welding together covered pipes or pipe pieces of about 12–24 meters launched from the ship as essentially horizontal lines, maintaining them in tension by suitable movements of the ship. By operating horizontally it is possible to work continuously because a number of welding stations can be positioned along the ship.

This launching system is known as S launching because before it becomes deposited on the sea bed the pipe assumes a double curvature of S shape.

A modification of this method is to weld together prefabricated pipe pieces of greater length (about 50–70 m) along a launching slip of variable inclination but close to vertical, so that the pipe forms a single J-shaped curve before it becomes deposited on the sea bed (J launching).

The advantage of J launching over S launching is that the tensions applied to the pipeline are considerably less than those of S launching, except in the case of very long support structures (stingers), which involve high risks to the integrity of the pipeline. However in J launching, operating through essentially vertical lines, the pipe pieces are joined together discontinuously in a single welding station, because the long pipe pieces are lifted and positioned on the slip one at a time and only after the preceding pipe piece has completed its joining operation. This results in a considerable operating time.

The limits of the two said launching systems explains why it has not been previously practical to lay trunk lines on sea beds of great depth. In this respect the use of very thick pipes to resist the laying stresses and the hydrostatic sea pressure would require in one case the application of enormous tensions difficult to achieve, and in the other case an unacceptable welding time.

The object of the present invention is to make it possible to lay underwater pipelines with a diameter of about 50–100 cm on sea beds of depth exceeding 1000 m.

BRIEF DESCRIPTION OF THE DRAWINGS

A specific embodiment of the present invention will be described with reference to the following drawings, wherein.

Figure 1:
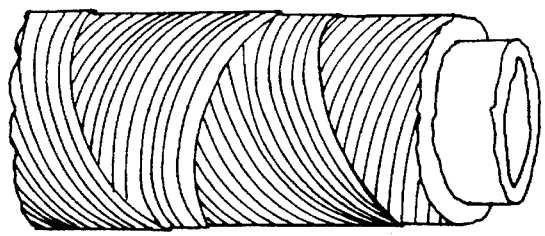
FIG. 1 illustrates an orthogonal view of the present invention.

This object can be achieved by mixed-structure pipes consisting of a steel core reinforced with a composite material containing continuous fibres, in such a manner that both the steel and the composite material act together to resist the radial and tangential stresses, the resistance to axial-stress being mainly or totally provided by the steel. This is shown in FIG. 1.

Figure 5A:
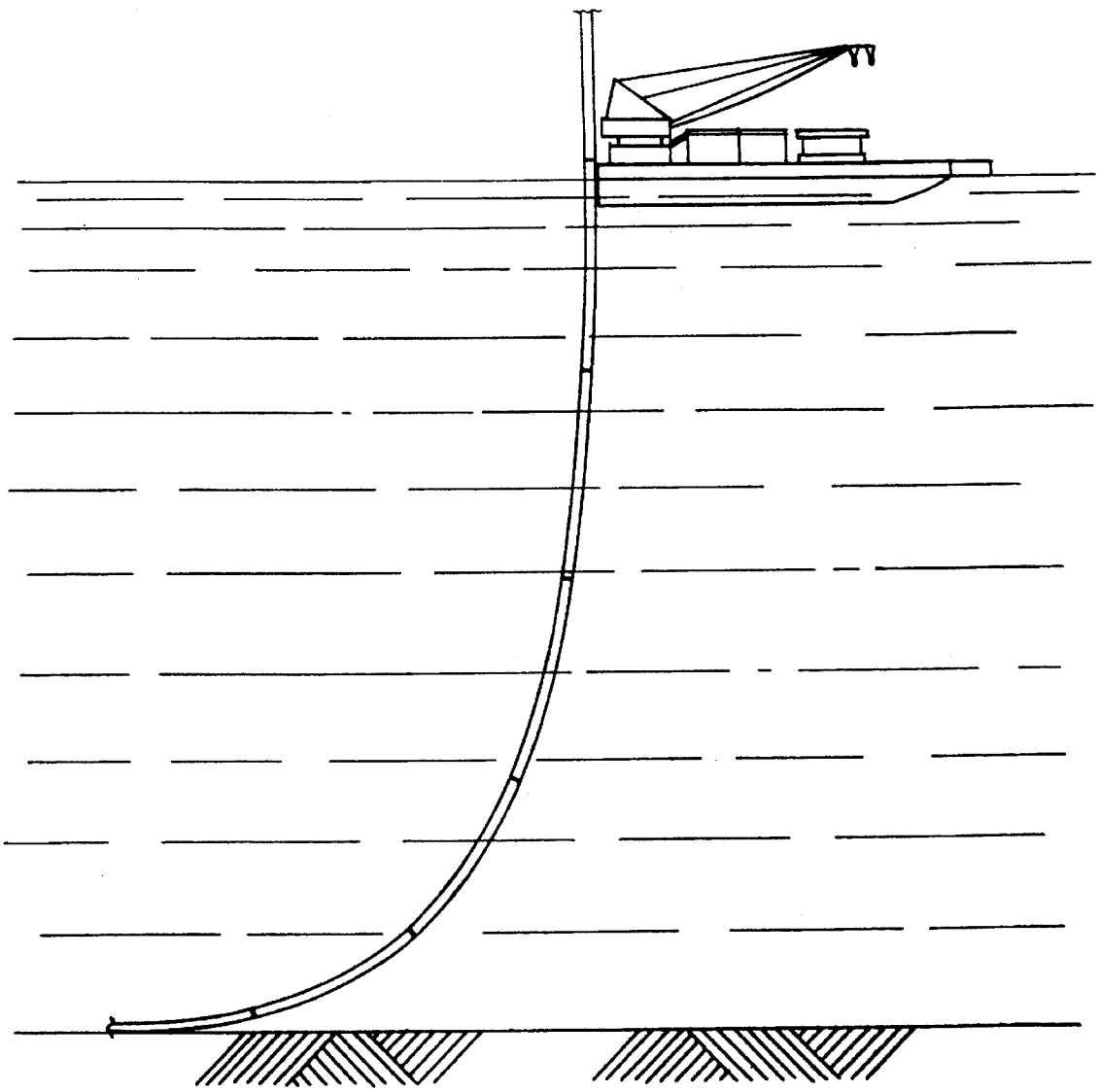
FIG. 5A is a diagrammatic illustration of the J launching technique.

The present invention therefore provides a method for laying underwater pipelines in deep water, using the J launching technique, (as illustrated in FIG. 5A) comprising joining together mixed-structure pipes consisting of a steel core reinforced with a composite material comprising a matrix containing continuous fibres and in which:

the continuous fibre is wound about the steel core as a helical winding which forms an angle of between 65° and 87° with the pipe axis;

the ratio of the thickness of the composite layer to the thickness of the steel core is between 2 and 8;

the weight of the mixed-structure pipe in water is between about 40 and 100 kg/m.

The steel core of the mixed-structure pipe used in the method of the invention is of conventional dimensions, in terms of length and diameter, as used in the J launching technique.

In contrast, its thickness depends on the depth of the sea bed on which the completed pipeline is to lie. In this respect, during laying, the main stress is axial stress due to the weight of the pipe in water and is supported exclusively or almost exclusively by the steel core in that, during this stage, the composite covering practically contributes nothing. The core thickness must therefore be at least sufficient to support the axial laying stresses which depend on the weight of the suspended pipeline in water.

The most commonly used thickness is generally between 20 and 30 mm.

The composite matrix material can be a thermosetting resin such as unsaturated polyester resins, epoxy resins, polyurethane resins etc., or a thermoplastic resin such as polyethylene, polypropylene, polyamide etc., of cement. The term "cement", as used in the present description and in the claims, means the material deriving from the hardening of a mix formed from water, cement, inerts such as sand, short fibres etc., and/or additives to improve adhesion to both the long and short fibres.

The fibres used for forming the mixed-structure pipe of the method of the present invention are those conventionally used for preparing fibre-reinforced resin articles, i.e. glass fibres, in particular type S glass fibres, aramidic fibres (KEVLAR), carbon fibres, boron fibres, high modulus polyethylene fibres etc. These fibres can be pre-impregnated with the matrix material and then be wound about the steel core, or be wound as such about the pipe and then impregnated with the matrix material by spraying it onto the fibres during winding, or by injection under pressure when the winding is complete.

The continuous fibres are wound over the entire length of the steel core with the exception of its ends, which are left free for a distance of about 50–100 mm, required for joining the pipes to the pipeline.

The mixed-structure pipe can also have an outer weighting covering formed from cement reinforced generally with metal mesh.

The joining system used in the method of the present invention is suitable for the single-station systems typical of the J launching technique and increases the productivity of the laying means.

Figure 2:
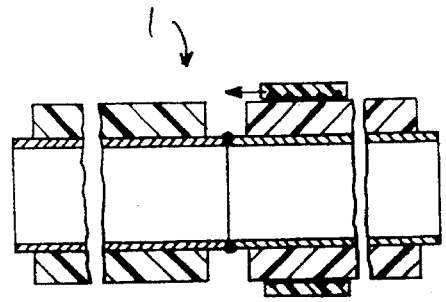
FIG. 2 illustrates a cross-sectional side view of the present invention.
Figure 3A:
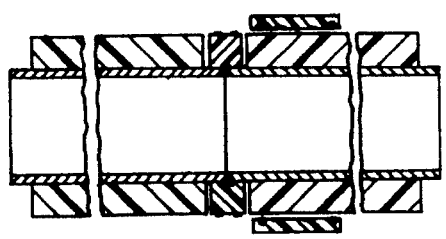
FIG. 3A illustrates a cross-sectional side view of the present invention showing locking the half-rings to obtain the final joint.
Figure 3B:
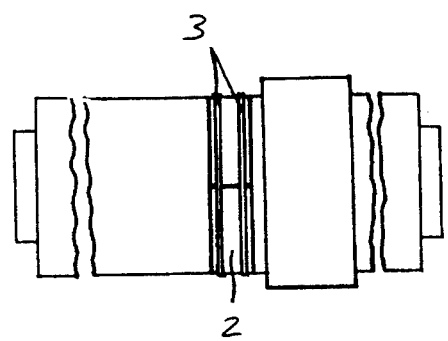
FIG. 3B illustrates a side view of the present invention showing locking the half-rings to obtain the final joint.

Specifically, the system for joining the pipes together and to the pipeline comprises:

i) joining the end of the steer core (1) by welding as shown in FIG. 2;

ii) restoring the physical continuity of the composite material of the mixed-structure pipes by superposing two prefabricated half-rings (2) of composite material reinforced with long or continuous fibres;

iii) locking the two half-rings by clips (3) or straps or by bolting or gluing, to obtain the final joint, as shown in FIGS. 3A and 3B;

iv) restoring the structural continuity of the joint by sliding over and superposing on the two half-rings of composite material a ring which is provided with two seal gaskets and has been premounted on the mixed-structure pipe which is in the process of being joined to the pipeline;

v) injecting into the interspace between the ring and joint a hardenable liquid able to resist triaxial deformation, in order to fill the cavities between the ring and the half-rings of composite material and between these latter and the outer ring.

Figure 4:
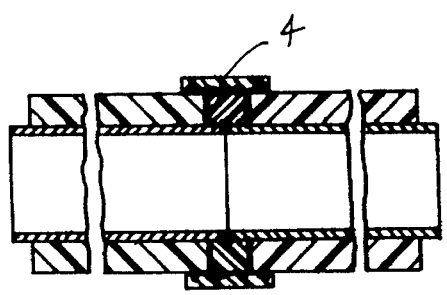
FIG. 4 illustrates a cross-sectional side view of the final seal gasket.

An alternative joining method comprises:

I) tapering the steel core ends not covered with the composite material to reduce their thickness to 10–15 mm;

II) joining the tapered ends by welding;

III) reinforcing the weld obtained in this manner by superposing two steel half-rings;

IV) joining the two half-rings together by making two longitudinal welds or by bolting;

V) restoring the physical continuity of the composite material of the mixed-structure pipes by superposing two further prefabricated half-rings of composite material reinforced with long or continuous fibres;

VI) locking the two half-rings by clips or straps or by bolting or gluing, to obtain the final joint;

VII) restoring the structural continuity of the joint by sliding over and superposing on the two half-rings of composite material a ring which is provided with two seal gaskets (4) and has been premounted on the mixed-structure pipe which is in the process of being joined to the pipeline;

VIII) injecting into the interspace between the ring and joint a hardenable liquid able to resist triaxial deformation, in order to fill the cavities between the core and the steel half-rings, between these and the half-rings of composite material, and between these latter and the outer ring. The final seal gasket is shown in FIG. 4.

The thickness of the two steel half-rings is such as to compensate at least the empty space due to the taper, and their cross-section is such that they match as faithfully as possible the profile of said taper. Their width is essentially equal to the length of the two tapered portions.

The composite material of the further two half-rings is preferably but not necessarily the same type of material as used in the mixed-structure pipe. These half-rings also have a cross-section such that they match as faithfully as possible the outer surface of the welded pipes or of the two steel half-rings. Their width and thickness are such as to restore the physical continuity of the pipeline, their outer surface hence being in line with the outer surface of the pipe. The two half-rings can be held together by clips or straps fitted into recesses which prevent them projecting from the outer surface, or by bolting or gluing. The ring which restores the structural continuity of the joint is premounted on the mixed-structure pipe which is to be joined to the pipeline. On completion of welding, and after applying the two steel half-rings and/or the two half-rings of composite material, the ring, which has an inner diameter slightly greater than the outer diameter of the pipe, by about 5–6 mm, is slid over until the gaskets straddle the joint.

The ring, which can be of steel or composite material, has a length slightly greater than the pipe portion occupied by the two half-rings of composite material, and is generally between 200 and 400 mm.

To complete the structural continuity of the joint, the method of the present invention comprises injecting a hardenable liquid able to resist triaxial deformation into the interspace between the ring and joint, in order to fill the cavities between the core and steel half-rings if present, between these and the half-rings of composite material and between these and the outer rings. This liquid can consist of a thermosetting resin to which a catalyst has been previously added, a thermoplastic resin or cement.

Figure 5B:
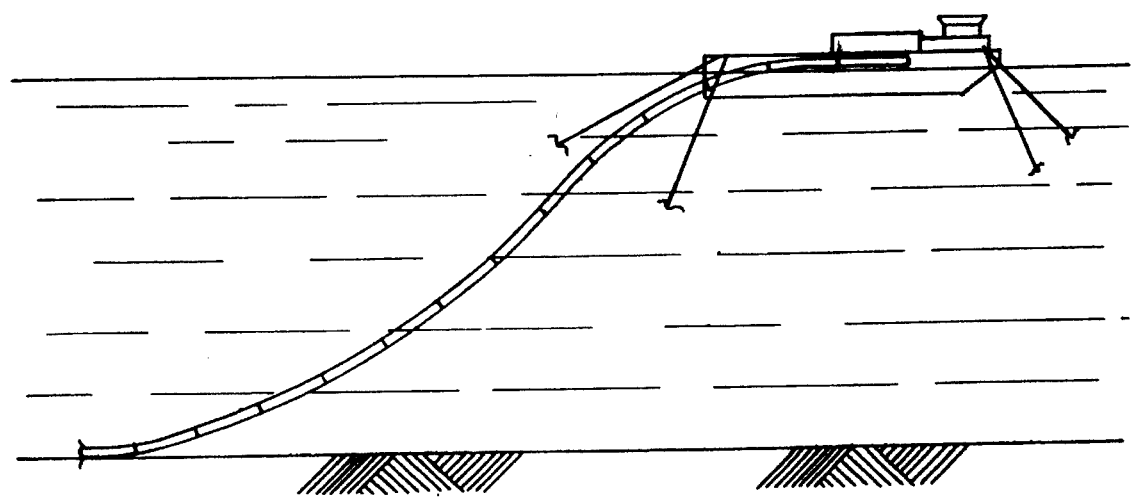
FIG. 5B is a diagrammatic illustration of the S launching technique.

The method of the invention has been described with reference in particular to the J launching technique for underwater pipelines in that it avoids the drawbacks associated with great depths. However, there is nothing to prevent its use in the S launching technique for low depths, as shown in FIG. 5B as a simple alternative to this system.

We claim:

1. A method of forming a pipe for deeply submerged applications, wherein the pipe has a steel core and a composite material thereon, wherein the steel core has an end, and wherein the method comprises:

a) helically winding the composite material about the steel core and forming an angle therewith ranging from about 65° to about 87°, wherein the ratio of the thickness of said helical winding to the thickness of the steel core ranges from about 2 to about 8, and wherein the weight of the pipe in water ranges from about 40 to about 100 kg/m;

b) welding the end of the steel core of the pipe to an end of a steel core of a second pipe;

c) superposing two half-rings of composite material upon said weld for restoring the continuity of the composite material on the pipes;

d) securing the half-rings to the welded pipe;

e) superposing an outer-ring having two seal gaskets upon the half-rings; and f) interposing an injectable hardenable liquid between the half-rings and the outer-ring wherein the liquid is able to resist triaxial deformation.

2. The method of claim 1, wherein the half-rings of composite material have an outer surface and wherein the outer surface is configured to match the outer surface of the pipe.

3. The method of claim 1, wherein the half ring has a length of from about 200 mm to about 400 mm.

4. The method of claim 1, wherein the hardenable liquid comprises a thermosetting resin, a catalyst, and a thermoplastic resin or cement.

5. A method of forming a pipe for deeply submerged applications, wherein the pipe has a steel core and a composite material thereon, wherein the steel core has an end, and wherein the method comprises:

a) helically winding the composite material about the steel core and forming an angle therewith ranging from about 65° to about 87°, wherein the ratio of the thickness of said helical winding to the thickness of the steel core ranges from about 2 to about 8, and wherein the weight of the pipe in water ranges from about 40 to about 100 kg/m and wherein the end of the steel core is not covered by the helical winding;

b) tapering the end of the steel core not covered by the helical winding for reducing the thickness to about 10 mm to about 15 mm;

c) welding said tapered end of the steel core of the pipe to an end of a steel core of a second pipe;

d) superposing two steel half-rings upon said weld for reinforcement;

e) joining the two steel half-rings to each other;

f) superposing two half-rings of composite material upon the two steel half-rings for restoring the continuity of the composite material on the pipes;

g) securing the half-rings of composite material to the pipes;

h) superposing an outer-ring having two steal gaskets upon the half-rings of composite material; and i) interposing an injectable hardenable liquid between the steel half-rings and the half-rings of composite material and between the half-rings of composite material and the outer-ring, wherein the liquid is able to resist triaxial deformation.

6. The method of claim 5, wherein the steel half-rings are configured to match said tapered ends.

7. The method of claim 5, wherein the steel half-ring has a length of from about 200 mm to about 400 mm.

8. The method of claim 5, wherein the hardenable liquid comprises a thermosetting resin, a catalyst, and a thermoplastic resin or cement.

* * * * *